United States Patent [19]

Kovarik

[11] 4,451,712
[45] May 29, 1984

[54] TESTER FOR REMOTE CONTROLLED RADIO SYSTEMS

[75] Inventor: Richard F. Kovarik, Bridgeview, Ill.

[73] Assignee: Industrial Electronics Service Co., Schaumburg, Ill.

[21] Appl. No.: 380,000

[22] Filed: May 19, 1982

[51] Int. Cl.³ .............................................. H04B 3/46
[52] U.S. Cl. ............................................ 179/175.3 R
[58] Field of Search ................ 179/175.3 R, 175.1 R, 179/84 VF, 175.31 R, 2 E, 2 A

[56] References Cited

U.S. PATENT DOCUMENTS 3,912,882 10/1975 Beerbaum .................... 179/175.3 R Primary Examiner—Stafford D. Schreyer
Attorney, Agent, or Firm—Hill, Van Santen, Steadman & Simpson

[57] ABSTRACT

A remote systems tester which greatly simplifies and speeds testing of remote controlled radio systems and communications lines which produces function tones, guard tones, tone bursts and also DC signals and which allows the time of transmission of the initial high level guard tone to be adjusted and also allows frequencies to be selected with a keyboard double tone selector and also allows frequencies to be synthesized with thumb wheels. The tester very accurately and quickly allows the testing of remote controlled radio systems and communications lines and eliminates substantial amount of equipment that is required in the prior art.

10 Claims, 10 Drawing Figures

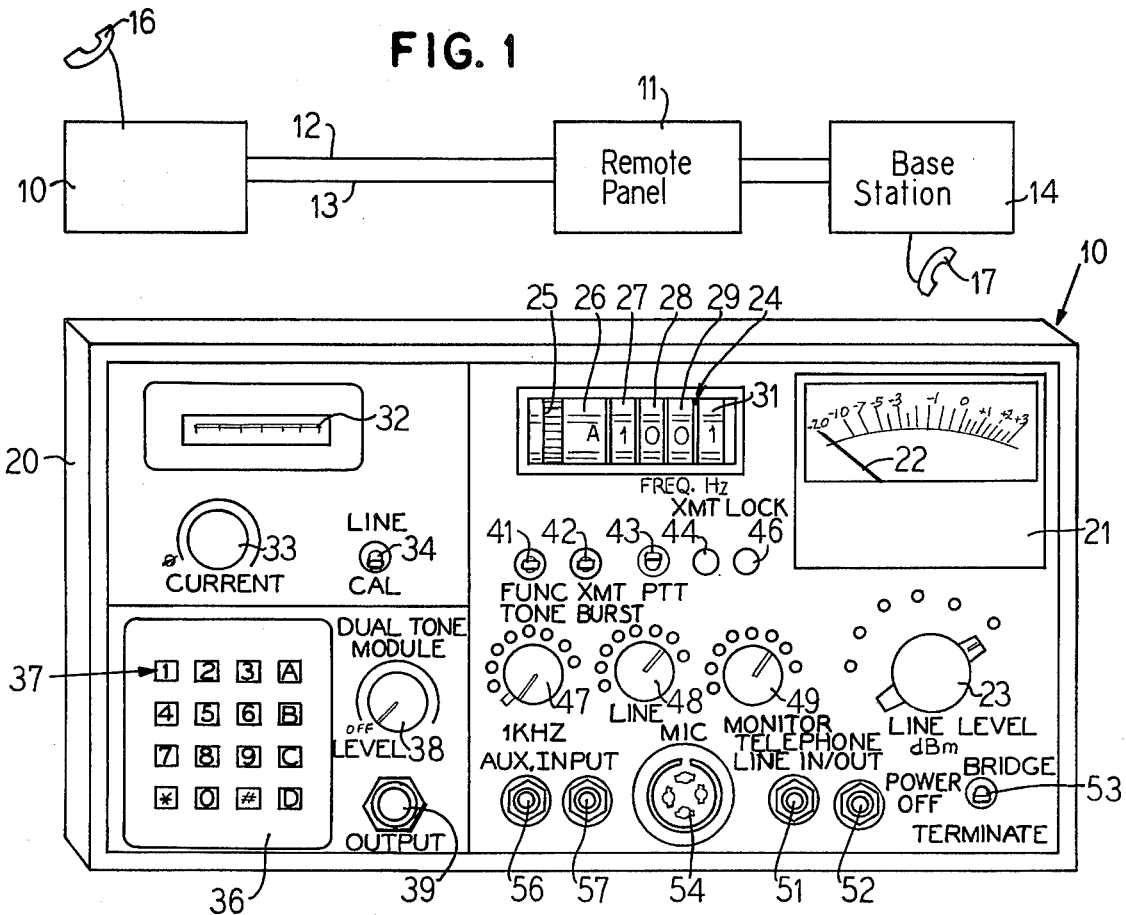
FIG. 1
FIG. 2
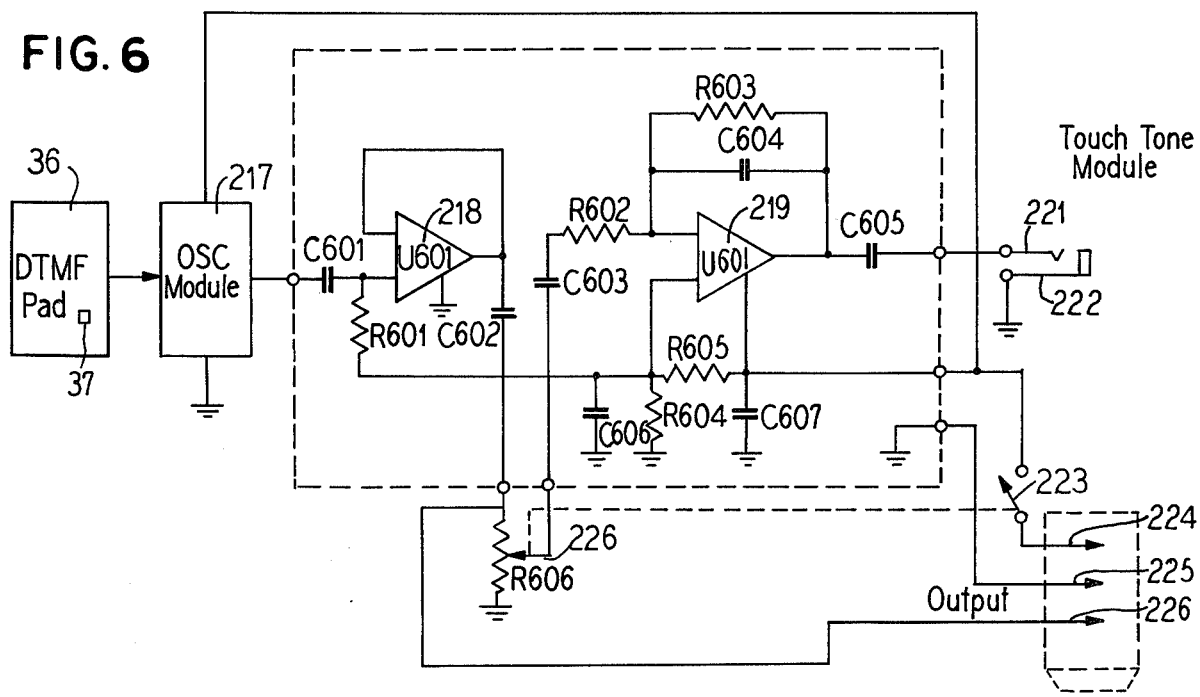
FIG. 6

TESTER FOR REMOTE CONTROLLED RADIO SYSTEMS

BACKGROUND OF THE INVENTION

1. Field of the Invention

This invention relates in general to remote controlled radio systems and communications line testing and in particular to an improved rapid and accurate tester.

2. Description of the Prior Art

The prior art testing of remote controlled radio systems and communications lines required a number of different meters and equipment which must be successively connected to the line for measuring various characteristics of the line. Also, oscillators had to be connected and adjusted so as to select specific frequencies for transmission through the lines and such procedures were made by the operator and operators at one or both ends of the lines so as to successfully connect the various equipment and make measurements.

SUMMARY OF THE INVENTION

The present invention comprises a portable tester for remote controlled radio systems which allow testing to be quickly and accurately accomplished. The trial and error methods using duplicate equipment of the prior art are slow and cumbersome. The present invention is a portable equipment for testing radio remote control systems including encoding circuits, decoding circuits, and communication lines, and other standard 600 ohm audio line applications. The product is versatile, flexible and saves money in testing time and equipment. The invention provides the features necessary for trouble shooting and level setting for tone remote control systems and can also be used to duplicate control functions of control consoles so as to operate and test remotely controlled base station equipment. It can also measure the levels and frequencies of audio signals generated by control consoles. The invention has the following features.

1. Tone synthesizer for generating various function tones.
2. Separate guard tone oscillator.
3. Separate 1000 Hertz tone generator.
4. Burst generator section that simulates actual operation of the base station control console.
5. Intercom feature provides a communication between the invention and a remote console operator or a second technician from either end of the communications line using a hand set or microphone and built-in speaker.
6. Wide range dBm meter allows measurement of hum and noise and tone levels down to −60 dBm and up to +13 dBm.
7. High quality line amplifier for matching or bridging phone lines.
8. Auxiliary input jacks for input from external audio generators for applications such as tone coded paging and continuous tone controlled squelch systems (CTCSS).
9. The equipment can be operated on battery or AC power.
10. A DC line module can be used for testing direct current control base stations.
11. The invention includes a dual tone module for providing dual tone multi-frequencies (DTMF) which can be quickly and accurately selected by depressing a 16 button keyboard.

In the present invention, the time duration of transmission of the guard tone can be selected with a thumb wheel and the frequency of one or more guard tones can be selected with a thumb wheel. Synthesizer thumb wheels allow frequencies to be selected. The invention allows the line level to be set with a suitable potentiometer as well as the monitor level and the level of the one thousand hertz tone.

The invention replaces seven or more products required for testing of the prior art and provides accurate and rapid testing of lines.

Other objects, features and advantages of the invention will be readily apparent from the following description of certain preferred embodiments thereof taken in conjunction withthe accompanying drawings although variations and modifications may be effected without departing from the spirit and scope of the novel concepts of the disclosure, and in which:

BRIEF DESCRIPTION OF THE DRAWINGS

FIG. 1 is a block diagram illustrating the invention in use for testing remote controlled radio systems;

FIG. 2 illustrates the front panel of the systems tester of the invention;

FIG. 6 is an electrical schematic of the dual tone module;

DESCRIPTION OF THE PREFERRED EMBODIMENTS

Figure 3A:
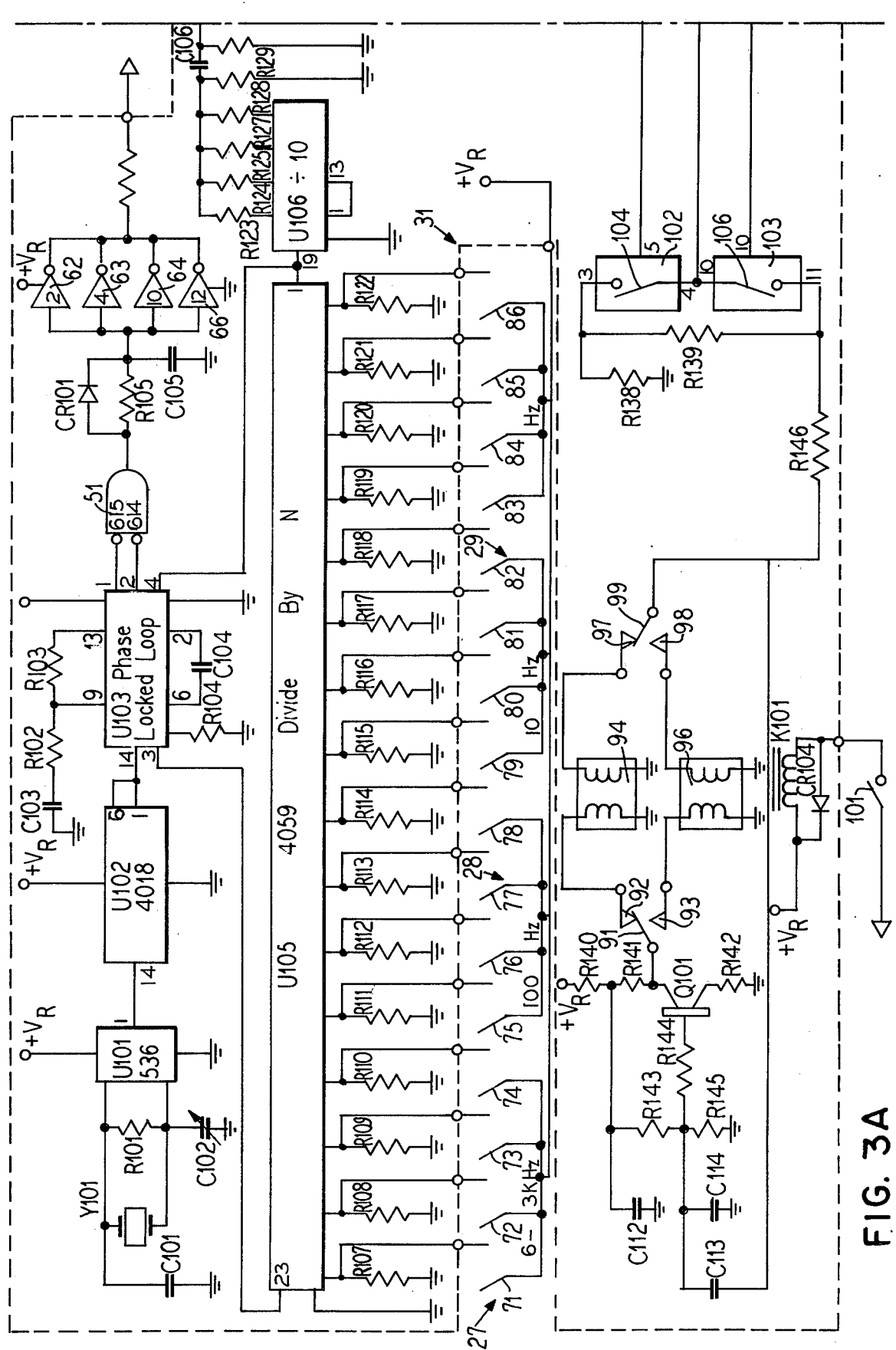
FIGS. 3A and 3B illustrate the digital synthesizer of the invention.

FIG. 1 illustrates the remote systems tester 10 of the invention and hand set 16 connected to communication lines 12 and 13 and a remote panel 11 and a base station 14 with hand set 17 are connected to the other end of the lines 12 and 13.

The remote systems tester 10 is shown in FIG. 2 which illustrates the case 20 and the front panel which has a meter 21 with a needle 22 for indicating dBm. A meter range switch 23 allows the range of the dBm meter 21 to be set from −60 dBm to +13 dBm. A number of thumb wheel switches 24 include a thumb wheel potentiometer 25 that adjusts the initial high level guard tone duration between maximum and minimum time levels. A two-position thumb wheel switch 26 either selects the standard 2175 Hz guard tone or an optional guard tone. Four synthesizer thumb wheels 27, 28, 29 and 31 allow selection of frequencies of 1 Hz separation.

A DC line current meter 32 is provided and an adjustment knob 33 allows current to be adjusted from 0 to 15 mA.

A switch 34 can be moved between line position and calibrate position.

A plurality of keys 37 are mounted in a key pad 36 for selecting dual tone signals. A knob 38 allows the level of the dual tones to be set. A connector plug 39 is provided for output. A first mode selection switch 41 can be moved to three positions which are "guard tone" "normal or norm" and "function tone". A second mode switch 42 can be moved to three positions which are "function burst", "com" and "transmit burst". A push to talk switch 43 can be locked in position for continuous transmission. A red LED indicator 44 is lighted when the equipment is in the transmit mode. A green LED 46 is lighted when the tone synthesizer is locked. A 1000 Hz tone level adjustment switch 47 allows the 1000 Hz tone to be adjusted. The line level can be adjusted with a line level pot 48. The volume of the incoming signal can be adjusted with the monitor level 49. Input-output connections for the "phone line" are provided by jacks 51 and 52 and a pair of auxiliary input jacks for external audio signals 56 and 57 are also provided. A microphone receptacle 54 is of the standard four pin type. An impedance power switch 53 can be set to power off, bridge and terminate positions.

Figure 3B:
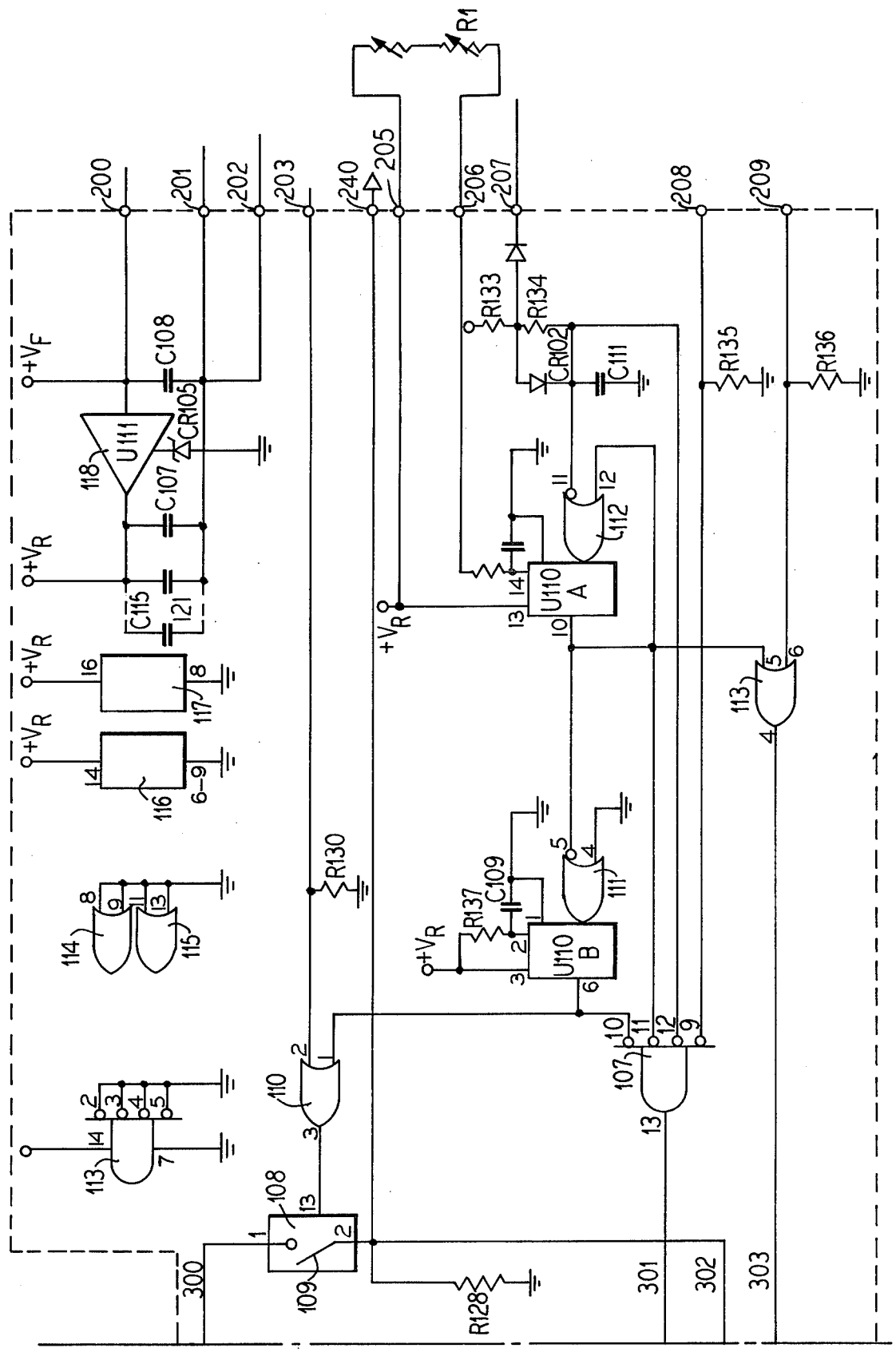

FIG. 3A and FIG. 3B illustrate the main synthesizer circuit which consists of integrated circuits U101 through U106 and which is controlled by the front panel thumb wheel switches. This section generates the function tones and covers the range of 60 Hz through 3999 Hz.

The synthesized tone frequencies are obtained from a 3.57945 MHz crystal Y101. The output of the crystal is supplied to U101 which might be a type MM5369. The output of U101 is at 60 Hz and is fed to U102 which is a divide by 6 circuit which produces an output of 10 Hz at pins 1 and 6. U102 might be a type 4018. The 10 Hz signal from U102 is supplied to U103 which is a phase lock loop portion of the voltage control oscillator section of U103. The linear VCO U103 produces an output signal from pin 4 which has a frequency determined by the voltage at pin 9 and the capacitor C104 connected between pins 6 and 7. The resistor R104 connected to pin 11 determines the maximum frequency of the loop. The phase detector is supplied from pin 13 to pin 9 through loop filter comprising resistors R102, R103 and capacitor C103. The resistors R102 and capacitor C103 set the time constant of the loop and resistor 103 is the damping resistor. The output of the VCO is taken from pin 4 of U103 and is supplied to programmable divide by "N" integrated circuit U105 pin 1. U105 may be a type 4059. The output of circuit U105 is fed back from pin 23 to pin 3 of U103 which comprises the phase comparator input. U105 which is a type 4059 divides the input frequency by any number "N" depending on the setting of the program switches and the output signal will be a pulse one clock cycle wide which occurs at a rate equal to the input frequency divided by "N". The four thumb wheel switches 27, 28, 29, 31 which include the switches 71 through 86 set the desired output frequency directly. The synthesizer frequency output is obtained at pin 4 of U103 and is 10 times the desired frequency. This signal is supplied to U106 which may be a type 4018 which is a divide by 10 circuit which also generates the composite sine wave output. The output frequency is available at pin 1 of U107 which may be a type 4016 analog switch. U107 comprises the components 102, 103 and 108. 51 is a U104 which might be a type 4572 which supplies an output through the circuits 62 through 66 to the lock LED 46. The guard tone switch is supplied to input terminal 209 and the transmit function switch is connected to terminal 208. The push to talk switch is connected to terminal 207. R1 is in the thumb wheel on the front panel and adjusts the time by thumb wheel 25. The tone burst out appears at terminal 203 through integrated circuits 110 and 107. 110 may be a type 4071. 107 may be a type 4002.

The guard tone oscillator and tone burst section of the digital synthesizer board produces the guard tone which is normally 2175 Hz and is dependent upon the selection of the reed 94, or 96 which is inserted into the sockets which are provided. The guard tone referred to as "A" comprises a resonant reed which is selected by the A/B switch located on the front panel. The 2175 Hz tone is generated by transistor Q101 and its associated circuitry and passes through relay contacts 91, 92, 97, 99 to the analog switches 102 and 103 which are controlled by the tone burst circuitry or the manual switches. The high level guard tone is sent at a level which is usually 0 dB reference for the tone burst. The low level guard tone is always 30 dB lower than the high level guard tone. This relationship is established by the resistors R138, R139 and R146.

The tone burst sequence section is comprised of 110 which might be a type 4071, 107 which might be a type 4002, and U110 which may be a type 4098. The integrated circuit U110 is the heart of the circut and is a duo monostable integrated circuit that provides very accurate timing pulses. U110A controls the initial high level guard tone burst which is 120 milliseconds in duration and can be varied by as much as 350 milliseconds by a potentiometer R1 which is the front panel thumb wheel 25. U110B provides the second burst duration for the function tone and is designed to provide 40 milliseconds duration, for example. Logic circuits are coupled to the duo monostable circuits and control the CMOS switches 102, 103 and 108 to control the sequencing and distribution of the high level and low level guard tone and the function tone in both the burst and manual modes.

In operation, the burst section is actuated by the push to talk line at terminal 208 which is located on the front panel or by a microphone or hand set. When the push to talk switch is actuated, it places ground at terminal 207 causing pin 11 at U110B to go low. This causes U110A to trigger. A pulse duration of 120 milliseconds is then generated if R1 is in the "NORM" position and this can be increased to as much as 350 milliseconds by rotating R1 in the "increase" direction.

The output pulse at pin 10 of U110A causes integrated circuit 110 which is a type 4071 to go high at its output pin 3 causing CMOS switch 108 to close sending the function tone for 40 millisecond period to terminal 204.

When the 40 millisecond time duration pulse burst output of U110A pin 6 goes low, it causes 107 which might be a type 4002 which is a duo four input NOR gate to go high at its output pin 13 causing CMOS switch 102 to close sending a 2175 Hz signal at a −30 dBm level to terminal 204 as long as the push to talk switch is depressed. The low level guard tone will only be activated if the front panel switches 41 is in the "NORM" position and switch 42 is in the "transmit burst" position. Circuit 107 which is a type 4002 must have all four inputs low to ensure that the low level 2175 Hz tone is sent only when the transmit function is valid. The conditions to provide a low on all four inputs of 107 are as follows.

Pin 9 will be low only when switch 42 is in the "transmit burst" position. Pin 12 will be low when the push to talk switch is activated. Pins 10 and 11 are normally low except when U110A or U10B are triggered.

Figure 4A:
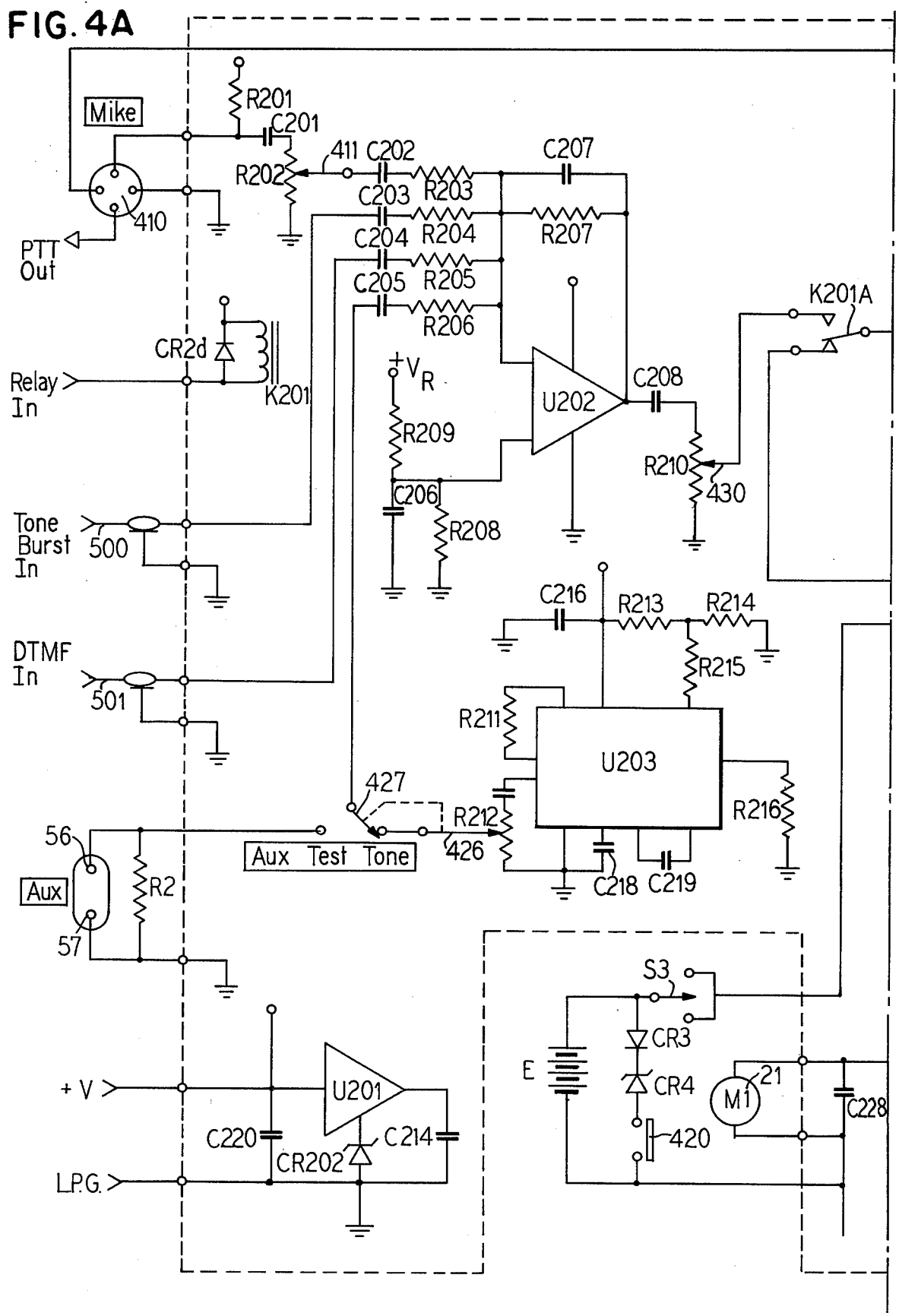
FIGS. 4A and 4B illustrate the audio and meter drive schematics.
Figure 4B:
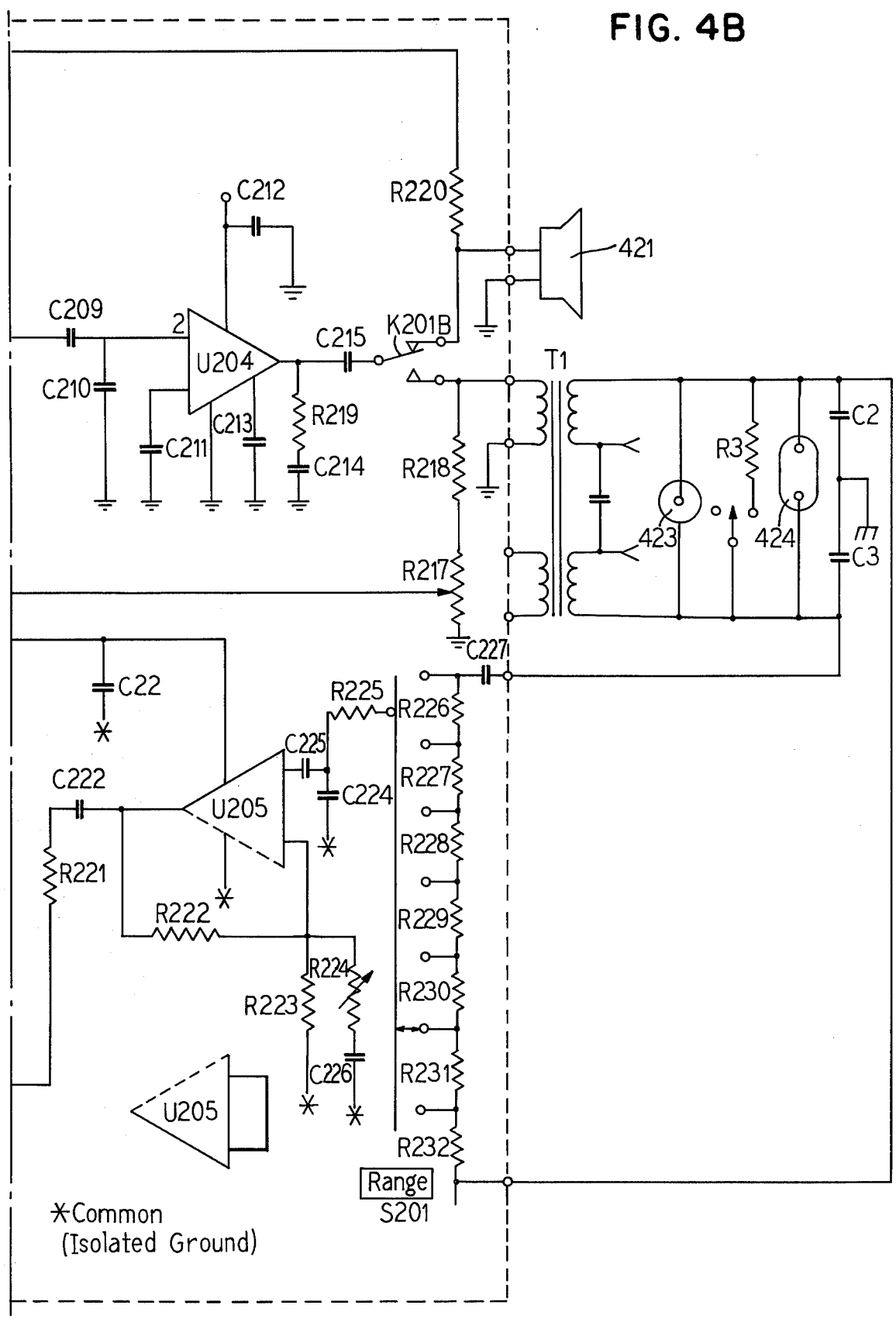

FIGS. 4A and 4B illustrate the audio line amplifier and meter board which contains the main line amplifier receive amplifier. The dBm meter amplifier circuitry and a 1000 Hz tone generator.

The amplifier consists of integrated circuits U202 which may be a type LF351 and integrated circuit U204 which may be a type LM380. The amplifiers coupled to the communications line by transformer T1-relay K201 controls the switching of the amplifier from the receive mode to the send mode. In the receive mode, the input signal from the line is coupled to the unit by transformer T1 and is received by the primary winding through resistor R218 and monitor control R217 which sets the speaker 421 level. The signal continues to normally closed relay contacts K201A through coupling capacitor C209 and is amplified by integrated U204 and passes through output coupling capacitor C215 through normally closed contacts K201B to the speaker 421.

In the send mode, an additional preamplifier/mixer circuit U202 which may be a type LF351 is used to combine the various tone and voice signals that are to be sent by way of the communicationsline. The signal paths initiated from the microphone input which appears at terminal 410 from the microphone passes through capacitor C201, potentiometer R202 and is coupled to integrated circuit U202 by capacitors C202 and resistor R203. The tone burst is supplied from terminal 500 and passes through capacitor C203 and resistor R204 to U202. The DTMF tones are supplied from terminal 501 through capacitor C204 and resistor R205 to U202. The auxiliary input signal is applied externally to the instrument at connectors 56 and 57 terminated to 620 ohms by resistor R2 and passes through Aux/1000 Hz switch 427 and is coupled to U202 by capacitor C205 and resistor R206. When the Aux/1000 Hz switch is in the OFF position, it allows external auxiliary signals to be passed through the amplifier. When the 1000 Hz tone generator is turned "ON" it disconnects the external Aux input and connects the 1000 Hz tone signal to the resistor R206 and capacitor C205 as described for the auxiliary input.

The signals are amplified by U202 and pass through capacitor C208 and potentiometer R210 which is the line level control 48 and through normally open contacts K201A which close when the push to talk switch 43 is closed. The signal is routed to the input of amplifier U204 pin 2 and is amplified and coupled to the line through capacitor C215 and relay contacts K201B to line transformer T1 and out of the tap secondary winding through contacts 424.

The dBm meter amplifier consists of U205 which may be a type LM387 integrated circuit and the meter 21 and the amplifier circuit comprising resistors R221 through R225 and capacitors C222 through C226. It is preceded by precision resistors R226 through R232 blocking capacitor C227 and switch S201 is a range switch.

The power supply for the meter board is isolated from the main supply by the use of standard nine volt battery E. A battery condition test circuit includes diodes CR3 and CR4 and switch S3. Calibration of the amplifier is accomplished by the use of variable resistor R224.

Figure 5:
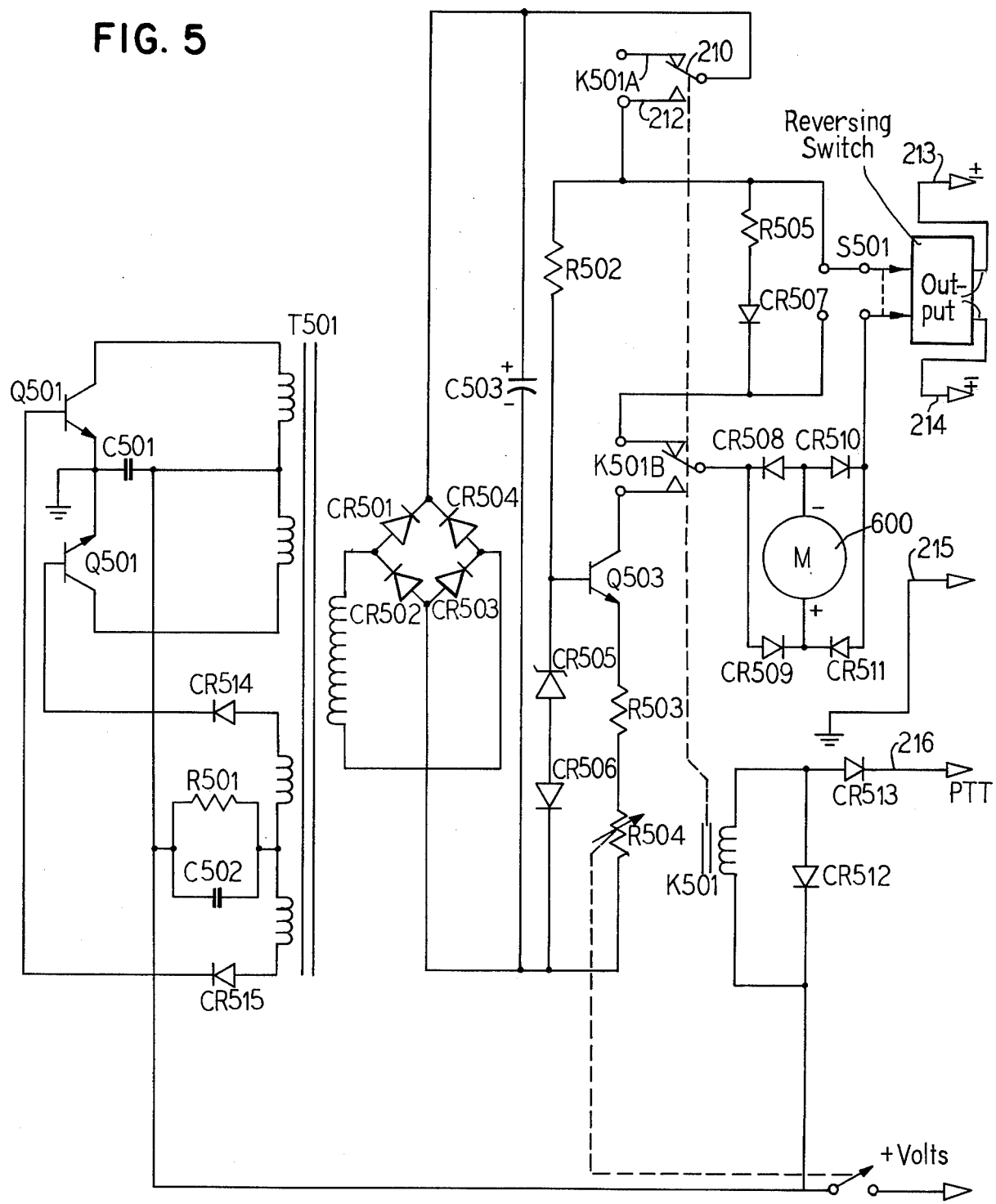
FIG. 5 is an electrical schematic of the DC-DC power supply.

FIG. 5 illustrates the DC line module which is a DC to DC power supply and generates a 15 milliampere current source at approximately 200 to 250 VDC.

The high voltage is generated by a transistor switching power supply comprising the transformer T501 and transistors Q501 and Q502 and the rectifier bridge comprising the diodes CR501 through CR504. Transistors Q501 and Q502 are alternately driven into saturation and cutoff at a frequency of approximately 23 KHz. The saturation and turn-off action of the transistors Q501 and Q502 induces a square wave in the secondary of transformer T501 which is applied to bridge rectifier CR501 through CR504 which results in a DC voltage output of 200-250 VDC. The positive output of the rectifier bridge is at the plus side of capacitor C503 and the negative side is at circuit ground which is not chassis ground. The push to talk switch 43 located on the main front panel controls relay K501 and must be activated when either presetting currents or sending line currents on the communicationsline. When the push to talk switch is activated, it closes relay contacts K501A placing 200 volt DC at the junction of resistors R502 and R505. If switch S501 is in the CAL position, it places resistor R505 and diode CR507 in series with the current meter 600 and current flow is furnished by diode CR511 through meter 600 and diode CR508 to the collector of regulator transistor Q503. Diodes CR505 and CR506, resistors R503 and R504 of the current set potentiometer allow presetting the required line current in the CAL position. When switch S501 is placed in the LINE position the high voltage is switched to the line output jacks through the secondary windings of transformer T1 and is available at the line in/output jacks on the front panel of the tester.

The line current passes from closed contacts of K501 A to switch S501 through transformer secondary winding to the output jack. The low side of the circuit is from collector of Q503 through relay contacts K501B through diode CR509, meter 600 and diode CR510 through the transformer winding to the output jack. A capacitor is used to block DC current flow between secondary windings but allows audio frequencies to pass.

FIG. 6 illustrates the line tester dual tone module which is a completely self-contained DTMF (dual tone multifrequency) tone generator. It consists of 16 button key pad 36 with the keys 37 the tone synthesizer and a two-stage amplifier circuit. The horizontal buttons are referred to as rows and the vertical buttons are referred to as columns. The frequencies of each of these are as follows

| Row | Column |
|---|---|
| 1 = 698 Hz | 1 = 1209 Hz |
| 2 = 770 Hz | 2 = 1336 Hz |
| 3 = 852 Hz | 3 = 1477 Hz |
| 4 = 941 Hz | 4 = 1633 Hz |

As each key is pressed it combines 1 each of a row and column frequencies resulting in a dual tone being produced. The dual tone signal is then available at the output of the oscillator module 217 which is supplied to the capacitor 601 to buffer amplifier U601 which might be a type LF353. It is then applied through capacitor C602 to the ungrounded end of potentiometer R606 and to contact 226 where it is supplied to the main amplifier of the test unit for amplification. The signals also pass through potentiometer R606 then through capacitor C603 and resistor R602 to the second portion 219 of U601. The amplifier signal is then passed through capacitor C605 to the front panel jack at terminals 221 and 222 for further use. The output gain level is controlled by potentiometer R606.

Figure 7:
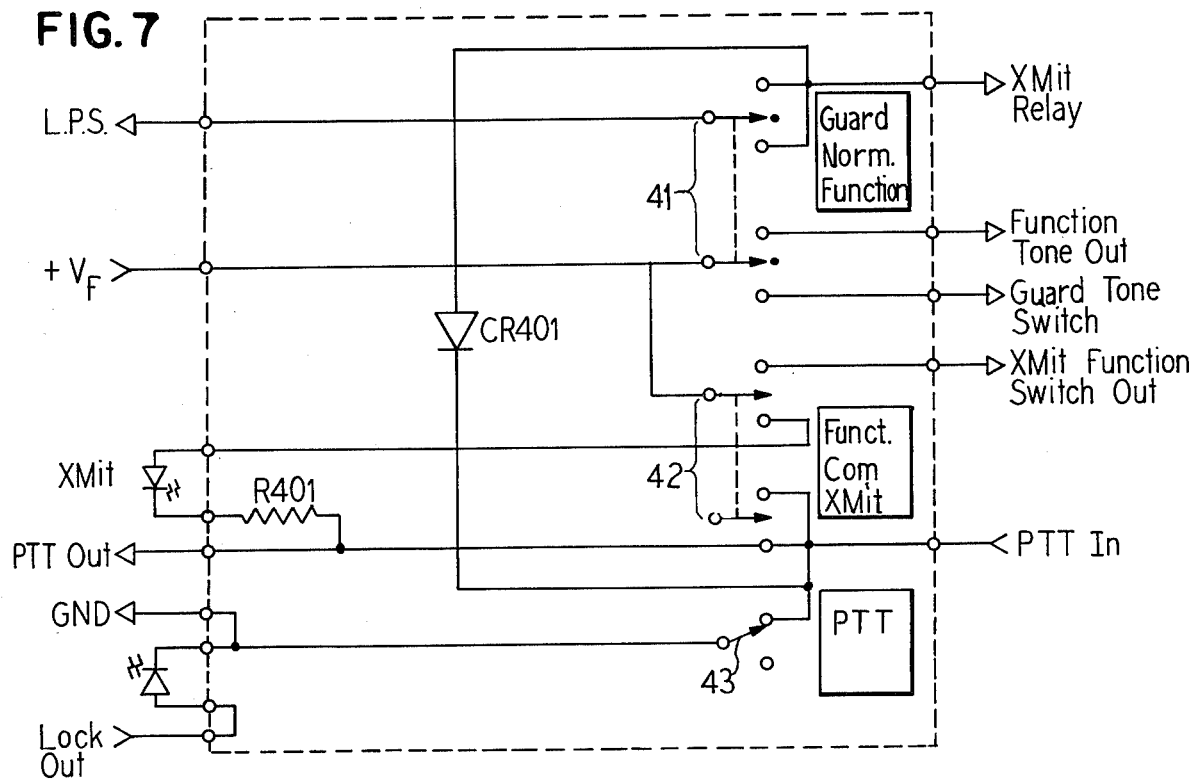
FIG. 7 illustrates the switching arrangement.

FIG. 7 illustrates the switching arrangement and discloses the interface for the switching circuits.

Figure 8:
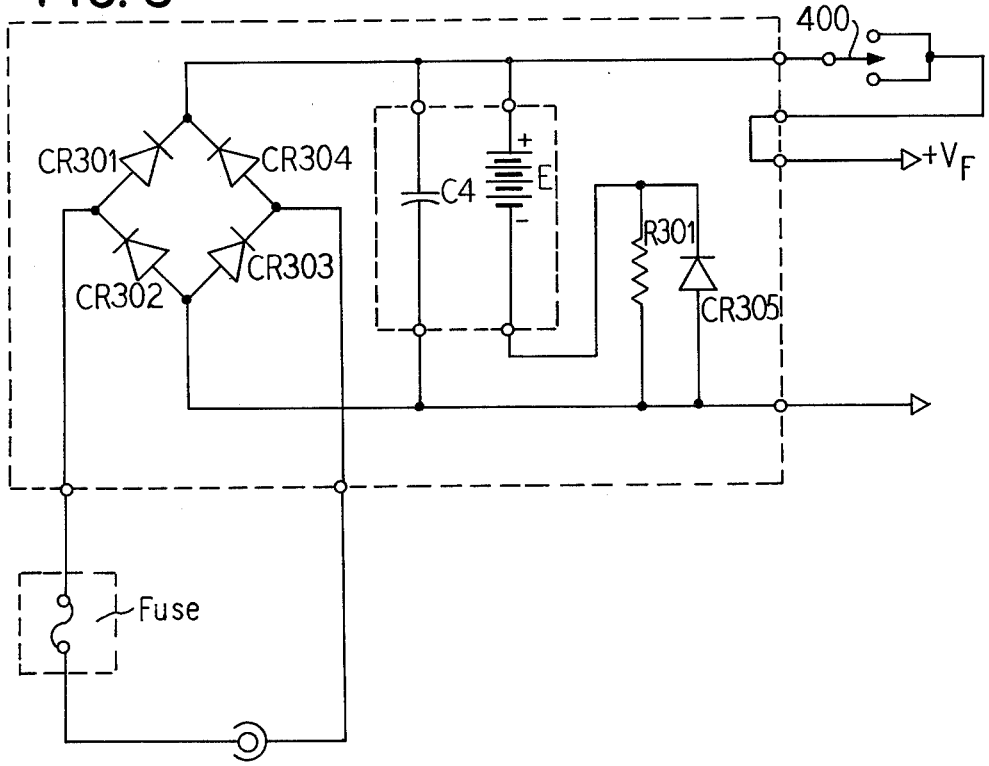
FIG. 8 illustrates the power supply.

FIG. 8 illustrates the power supply where power is applied from terminal 400 to the rectifier diodes CR301 through CR304 which is in parallel with the battery E.

In use when switch 41 is in "NORM" position and switch 42 is in "XMT Burst" position a high level Guard Tone (2175 Hz) will initially be transmitted for a time adjustable with thumb switch 25, then a function tone will be transmitted and then a low level Guard Tone will be transmitted. Different signal formats can be transmitted by moving switches 41 and 42 to different positions.

It is seen that the invention provides a novel testing circuit for remote controlled radio systems and communications lines and although it has been described with respect to preferred embodiments it is not to be so limited as changes and modifications may be made therein which are within the full intended scope as defined by the appended claims.

I claim as my invention:

1. A remote systems tester comprising a guard tone generator, a function tone generator, means for adjusting the level of either the guard tone or the function tone such that when either level is set the amplitude relationship will be automatically established so that the function and second guard tones will be at lower levels than the initial guard tone, and means for sequentially connecting the outputs of said guard tone generator and said function tone generator to the communication lines to be tested.

2. A remote systems tester according to claim 1 including mode selector switches which can be set to transmit a guard tone at a first level for a predetermined time, then a function tone at a second level and then a guard tone at a third level.

3. A remote systems tester according to claim 2 wherein said mode selector switches can also be set to transmit a guard tone and subsequently a function tone.

4. A remote systems tester according to claim 2 wherein said mode selector switches can be set to transmit a continuous function tone.

5. A remote systems tester according to claim 2 wherein said mode selector switches can be set to transmit a continuous guard tone.

6. A remote systems tester according to claim 1 also including a dual tone generator for simultaneously producing two audio tones to be supplied to portions of the system to be tested.

7. A remote systems tester according to claim 6 wherein said dual tone generator is controlled by a plurality of key switches each of which cause two audio tones to be produced.

8. A remote systems tester according to claim 1 comprising a constant direct current generator with adjustable output level and supplying an output to said switching means for supplying direct current to said line to be tested.

9. A remote systems tester according to claim 8 including a polarity reversal switch connected to the output of said constant current generator for reversing polarity.

10. A remote systems tester according to claim 1 comprising intercom means for transmitting and/or receiving audio signals over said line.

* * * * *